(No Model.)

F. J. NEWACHECK.
VEHICLE SEAT LOCK.

No. 291,389. Patented Jan. 1, 1884.

WITNESSES
Wm A. Skinkle
H. W. Elmore.

INVENTOR
Frank J. Newacheck

By his Attorneys
Baldwin, Hopkins & Peyton

N. PETERS, Photo-Lithographer, Washington, D. C.

UNITED STATES PATENT OFFICE.

FRANK J. NEWACHECK, OF GREEN SPRING, OHIO.

VEHICLE-SEAT LOCK.

SPECIFICATION forming part of Letters Patent No. 291,389, dated January 1, 1884.

Application filed November 6, 1883. (No model.)

*To all whom it may concern:*

Be it known that I, FRANK J. NEWACHECK, of Green Spring, in the county of Seneca and State of Ohio, have invented certain new and useful Improvements in Seats for Vehicles, of which the following is a specification, reference being had to the accompanying drawings.

The object of my invention is to produce a seat that may be readily detached from the vehicle when not wanted for use, and readily applied again, and also may be turned up on hinges out of the way or to keep it from exposure to the weather.

Figure 1:
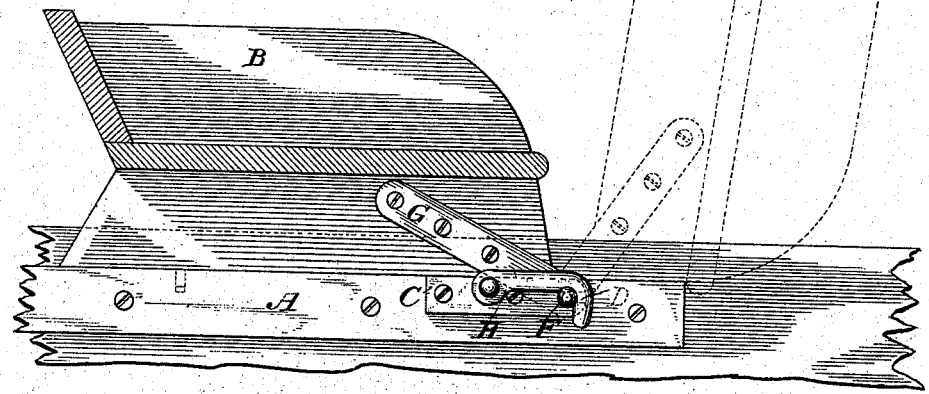
Figure 2:
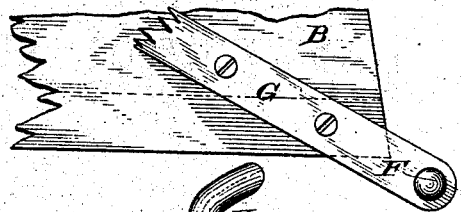
Figure 3:
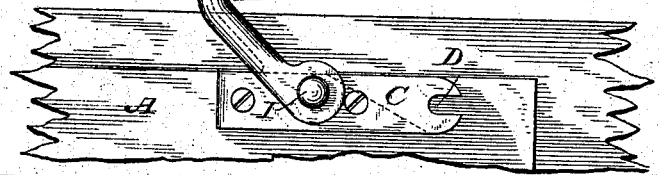
Figure 4:
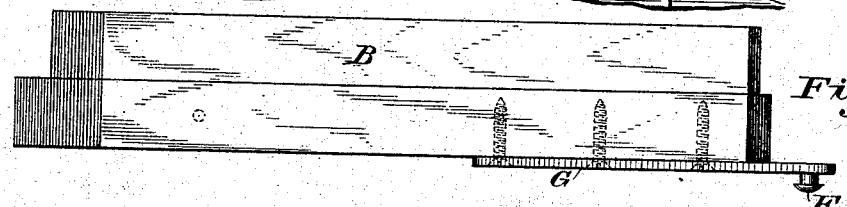
Figure 5:
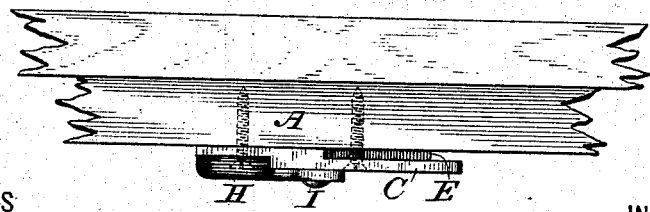

In the accompanying drawings, Figure 1 is a section of a vehicle-seat and so much of a vehicle-body and seat-rail as is necessary to illustrate the application of my invention. Fig. 2 is a detached section, showing an oblique strap secured to a portion of the seat. Fig. 3 is another detached section, showing a portion of the seat-rail, with a strap and hook for hinging the seat. Fig. 4 is a plan view of the parts illustrated in Fig. 2. Fig. 5 is another plan view, showing the parts illustrated in Fig. 3.

Referring to the letters upon the drawings, A indicates a seat or box rail. B indicates a seat, and C indicates a strap or bearing for hinging the seat to the rail. This strap is secured to the side of the rail by bolts or otherwise, as indicated, and is provided at one end with a slot, D, and a recess, E, to accommodate the pivot F upon a strap, G, secured to the seat, as indicated. H indicates a hook, pivoted at I upon the slotted strap C, and adapted to hook down behind the pivot F and hold it securely in place within the slot D.

From this description it will be seen that by unhooking the hook H the pivot F may be slipped out of the slot D and the seat removed. Each end of the seat is provided with parts like those described, and operating in the same way, so that the seat can either be turned up out of the way or removed entirely at will; but I have illustrated the parts upon one end of the seat only. I thus provide a very cheap and convenient means for attaching or detaching the seat, as well as for adjusting it to different positions, according to convenience.

Having thus described my invention, what I claim as new, and desire to secure by Letters Patent of the United States, is—

The combination, with the seat-rail, of the hinged detachable seat, connected to the rail by means of the slotted recessed strap C, the pivot-strap G, and the pivoted hook I, substantially as set forth.

In testimony whereof I have hereunto subscribed my name this 30th day of October, A. D. 1883.

FRANK J. NEWACHECK.

Witnesses:
C. S. BURTON,
L. F. JULIAN.